United States Patent [19]

Pusch

[11] 4,235,396
[45] Nov. 25, 1980

[54] NIGHT SIGHTING ARRANGEMENT

[76] Inventor: Günter Pusch, Bannholzweg 12, 6903 Neckargemund-Dilsberg, Fed. Rep. of Germany

[21] Appl. No.: 871,834

[22] Filed: Jan. 23, 1978

[51] Int. Cl.³ .............................................. F41G 7/00
[52] U.S. Cl. ................................................. 244/3.11
[58] Field of Search .................... 244/3.11, 3.16, 3.17, 244/3.12, 3.13

[56] References Cited

U.S. PATENT DOCUMENTS

| 3,974,328 | 8/1976 | Thomas et al. | 244/3.17 |
| 3,974,383 | 8/1976 | Chapman | 244/3.11 |
| 4,106,726 | 8/1978 | Emmons et al. | 244/3.17 |

Primary Examiner—Charles T. Jordan
Attorney, Agent, or Firm—Haseltine, Lake & Waters

[57] ABSTRACT

A night sighting arrangement for automatic guidance of missiles, in which an image is displayed in Cartesian coordinates for the observation and target recognition. An image display in polar coordinates is provided for target identification and aiming procedures, as well as missile guidance correction. The display in Cartesian coordinates has a pivoting mirror used for the horizontal deflection. A polygon prism is used for the vertical deflection where reversal optics systems required for polar scanning, are fixed and the image is rotated by 90° relative to the scan direction of the deflection mirror by the reversal optics. For the polar scan, the deflection mirror is held fixed in the middle position, and the optical elements causing the image rotation are rotated at half the image frequency. The same deflection mirror is used for the infrared picture taking and the optical image display, so that automatic synchronization takes place in the image direction during Cartesian display. The diameter of the polar image field and the height of the Cartesian image field are the same.

10 Claims, 4 Drawing Figures

NIGHT SIGHTING ARRANGEMENT

BACKGROUND OF THE INVENTION

The present invention relates to a thermal sighting and position finding method which permits observation and target recognition in a horizontal-wide image field and target identification. The aiming process and the guidance of missiles may be carried out in a circular and much smaller image field.

An object of the present invention is to provide a night sighting arrangement, of the foregoing character, which is substantially simple in construction and may be economically produced. Another object of the present invention is to provide a night sighting arrangement, as described, which may be readily maintained in service and which has a substantially long operating life.

A further object of the present invention is to provide a night sighting arrangement, as described, which may be used with relatively little skill on the part of the operator.

SUMMARY OF THE INVENTION

The objects of the present invention are achieved by providing a sighting arrangement for automatic guidance of missiles, in accordance with the German Patent Application No. P 25 33 270, and in which an image display for the observation and target recognition is provided in Cartesian coordinates. The image display for the target identification and aiming procedures, as well as the missile guidance correction, is provided in polar coordinates.

A pivoting mirror is used in the display in Cartesian coordinates, for the horizontal deflection, and a polygon prism is used for the vertical deflection where the reversal optics systems required for polar scanning, are fixed, and the image is rotated by 90° relative to the scan direction of the deflection mirror by the reversal optics.

For the polar scan, the deflection mirror is held fixed in the middle position, and the optical elements causing the image rotation, are rotated at half the image frequency. The same deflection mirror is used for the infrared picture taking, and the optical image display, so that an automatic synchronization takes place in the image direction during Cartesian display.

The diameter of the polar image field and the height of the Cartesian image field are the same, and the horizontal deflection is much greater with the Cartesian display, as for example, three to five times the vertical deflection.

The image transmission to the auxiliary side results via a fiber optics system with input at which the Cartesian and polar image are displayed with varying magnification.

The fiber optics system has a rectangular cross-section which is fully occupied by the image field in the case of the Cartesian display. With the polar display, the image field diameter is displayed on the wide side of the rectangular cross-section, so that the upper and lower part of the circular image field is cut off during aiming and identification.

A visual reproduction is made on TV camera tubes which supply a standard video signal with which the image display in one or several colors is possible on conventional TV monitors. The background is displayed in another color, in a conventional manner, and in a different geometric and thermal resolution than the target.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
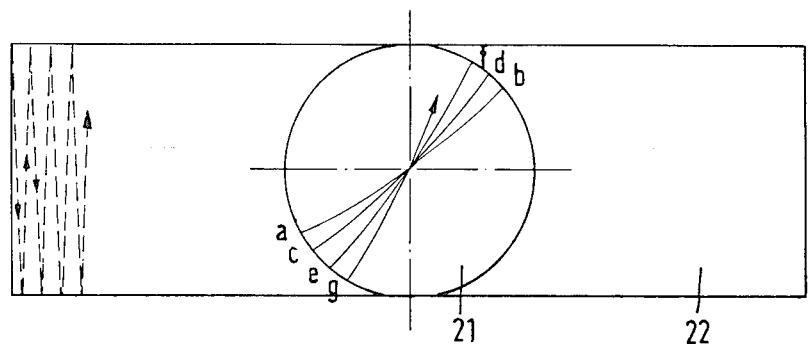
FIG. 1 is a diagramatic view and shows the polar image field, the Cartesian image field, and scanning movement.

In accordance with the present invention, the image display for observing and target recognition is made in Cartesian coordinates. The image display for the target identification and the aiming process, and the missile correction is carried out in polar coordinates. FIG. 1 shows the polar image field 21 and Cartesian image field 22, and the proposed scan movements.

Figure 2:
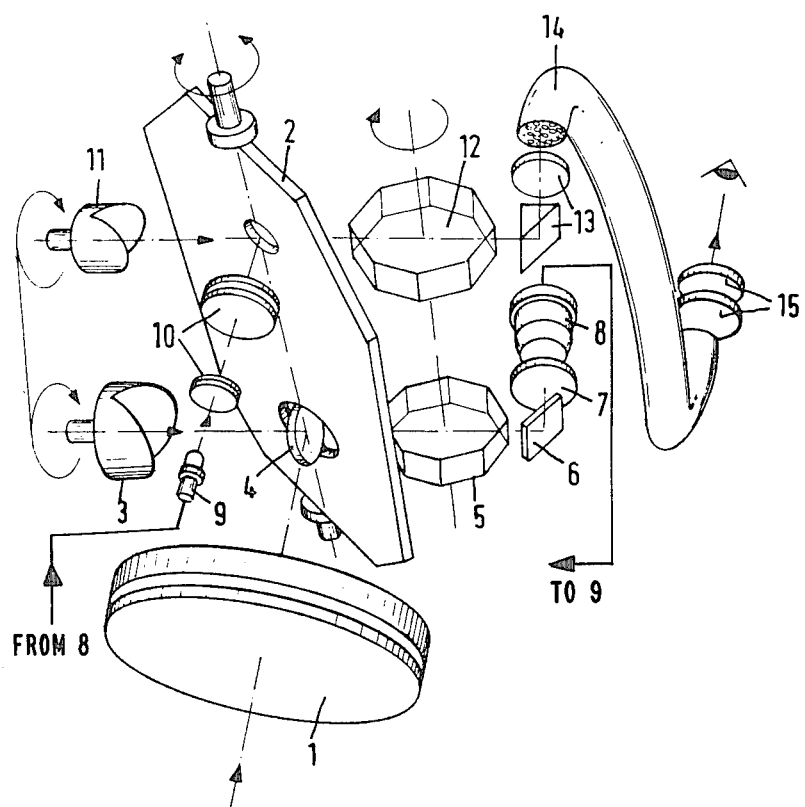
FIG. 2 is a perspective view and shows schematically the essential elements and their inter-relationship in an embodiment of the present invention.

FIG. 2 shows a possible arrangement for implementing this method. The IR radiation entering through the input objective 1 is reflected via a pivoted mirror 2 on a reversing arrangement 3, and is focused via a known transformation lens 4 on a deflection polygon 5. The infrared beam reaches the detector arrangement 8 via a deflection mirror 6 and a transformation optical system 7.

After amplifying the electrical signals delivered by the detector, they are transformed by a luminescence arrangement 9 into visible radiation, projected via a projection optical system 10 back to the pivotable deflection mirror 2 and they are then projected via the reversal optical system 11 on the polygon 12 which then causes the line deflection. Via the deflection prism and the projection optical system 13, the image is displayed on the output of the fiber optical system 14 which makes possible observation by the target (guidance) operator via eyepiece 15.

The reversal optical systems 3 and 11 are rotated in accordance with the invention by a common drive without play; also the polygons 5 and 12 are rotated by a common drive on a common axis. Since the pivotable reflection mirror 2 is used jointly for the IR optical reception channel and the visual reproduction channel, the above measures ensure absolute synchronism between reproduction and reception scan.

In accordance with the present invention, for the display in Cartesian coordinates, the pivot mirror 2 is moved sawtooth-like and thus causes the horizontal deflection of the cone of rays. In this case, both reversal optical systems are fixed and rotated by 45° so that they rotate the image by 90°. Thus, the polygons 5 and 12 may cause a vertical scan during their rotation.

With the polar scan, mirror 2 is fixed and the reversal optical systems 3 or 11 rotate at a speed corresponding to half the image frequency. Thus the polar image diameter will equal the height of the Cartesian image.

There also is the possibility that by shifting the axis on which the polygons 5 and 12 are located, other dimensions may be placed into the paths of rays so that the radial deflection in the polar image can be changed.

In accordance with another embodiment of the invention, the horizontal deflection from the Cartesian image should be much larger, about three to five times the vertical deflection. This has the advantage that in the observation of the terrain, the guidance operator can recognize appearing targets in a wide horizontal strip.

Since the resolution in the center of the polar display can be made much better than in a Cartesian image (display) field, the recognized target, for target identification, is placed in the center of the display and then switched to the operational mode, "aiming", i.e. polar scanning.

Since the device is to be installed on already available daytime sights, it is proposed to present the display via a fiber optics system to the eye of the guidance operator, with different magnifications being selected for the "observation" mode and the "aiming" mode.

Figure 4:
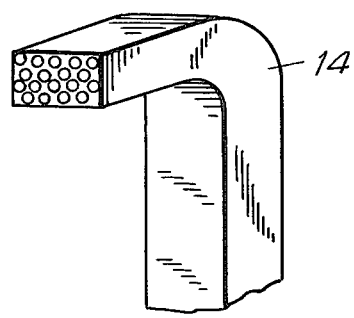
FIG. 4 is a view similar to FIG. 3 but of still another embodiment.

The present invention provides that for a fiber optics system 14a of rectangular cross-section (see FIG. 4), which offers advantages for the Cartesian display, in the polar display only the middle (center) strip is transmitted so that the upper and lower part of the circular image field is cut off during the modes "aiming" and "identification".

Figure 3:
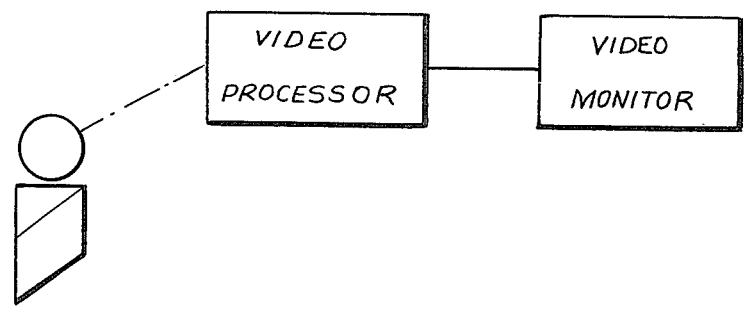
FIG. 3 is a fragmentary view showing a detail of a further embodiment.

In accordance with another inventive concept (see FIG. 3), instead of the fiber optics system, one or several TV cameras (one shown) receive the display path of rays; they then produce a standard video signal which can be observed on as many monitors as desired (one shown).

Of course, in this process there also is the possibility that target and background be represented in a known manner by various colors. Both the geometric and thermal resolution are selected differently for the various color channels depending on the purpose.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention, and therefore, such adaptations should and are intended to be comprehended within the meaning and range of equivalence of the following claims.

What is claimed is:

1. A night sighting method for automatic guidance of missiles comprising the steps of: displaying an image for observation and target recognition in Cartesian coordinates; displaying an image for target identification and aiming procedures, and missile guidance correction in polar coordinates; and displaying image background in a different color and different geometric and thermal resolution than the target.

2. A method as defined in claim 1 including the step of pivoting a mirror in displaying Cartesian coordinates for the horizontal deflection; rotating a polygon prism for vertical deflection; fixing reversal optics systems required for polar scanning; and rotating an image by 90° relative to a scan direction of said mirror by said reversal optics systems.

3. A method as defined in claim 2 including the step of holding fixed said mirror in the middle position for a polar scan; and rotating the optical element producing image rotation at half the image frequency.

4. Apparatus for night sighting in automatic guidance of missiles comprising: means for displaying an image for observation and target recognition in Cartesian coordinates; means for displaying an image for target identification and aiming procedures and for missile guidance correction in polar coordinates: one deflection mirror for both infrared picture taking and optical image display so that automatic synchronization occurs in the image direction during Cartesian display.

5. Apparatus as defined in claim 4 wherein the polar image field has a diameter substantially equal to the height of the Cartesian image field.

6. Apparatus as defined in claim 4 wherein the horizontal deflection with the Cartesian display is substantially greater by 3 to 5 times the vertical deflection.

7. Apparatus as defined in claim 4 including a fiber optics system for transmitting an image to an observer's eye, said fiber optics system having an input adapted to have Cartesian and polar images displayed thereat with varying magnifications.

8. Apparatus as defined in claim 7 wherein said fiber optics system has a rectangular cross-section adapted to be substantially fully occupied by the image field in the Cartesian display, whereas in the polar display the image field has a diameter displayed on the wide side of the rectangular cross-section so that an upper and lower part of a circular image field are cut off during aiming and identification.

9. Apparatus as defined in claim 4 including TV camera means supplying a standard video signal for visual reproduction, the image display appearing in at least one color on a TV monitor.

10. Apparatus as defined in claim 9 wherein the background is displayed in another color and in a different geometric and thermal resolution than the target.

* * * * *